(No Model.)

A. ANGELL.
MACHINE FOR DRESSING AND STRIPPING THE LEAVES OF FIBROUS PLANTS.

No. 264,055. Patented Sept. 12, 1882.

WITNESSES:

INVENTOR
Albert Angell
BY David A. Burr
ATTORNEY

UNITED STATES PATENT OFFICE.

ALBERT ANGELL, OF EAST ORANGE, ASSIGNOR TO DAVID A. BURR, OF MONTCLAIR, NEW JERSEY.

MACHINE FOR DRESSING AND STRIPPING THE LEAVES OF FIBROUS PLANTS.

SPECIFICATION forming part of Letters Patent No. 264,055, dated September 12, 1882.

Application filed December 28, 1881. (No model.)

*To all whom it may concern:*

Be it known that I, ALBERT ANGELL, residing at East Orange, county of Essex, and State of New Jersey, have invented certain new and useful Improvements in Machines for Dressing and Stripping the Leaves of Fibrous Plants; and I do hereby declare that the following is a full, clear, and exact description thereof, reference being had to the accompanying drawings, and to the letters of reference marked thereon, making a part of this specification.

My invention relates to certain improvements in machines employed for decorticating the leaves of fibrous plants; and it has for its object the construction of a machine adapted for the removal of the hard outer coating of the leaf of the *Bromelia sylvestris* and kindred plants which are hard upon one side only, or which, being entirely incased with a hard outer coating, are so thin or flat as to admit of being scraped upon opposite sides without the necessity of splitting them in two for the purpose, or which otherwise admit of being effectually flattened for the same purpose.

The method involved in my organized machine for the removal of the outer coating of the leaves to be acted upon and treated is, first, to cut the hard outer coating transversely or crosswise as fed through the machine, so as to form a series of gashes; second, to support the leaves upon an elastic feed-bed while being acted upon by the revolving cutters, so as to preserve the fiber of the leaves; and, thirdly, to remove or scrape the gashed coat section by section neatly and cleanly, as will be hereinafter more fully set forth. Attempts have heretofore been made to remove the hard coating of the leaves of these plants by means of scraping-rollers without a preparatory cutting without success, for the reason that the scraping-rollers would tear into and break the fiber of the leaves.

My invention therefore consists in a machine of the class described, having a revolving cutting-roller for gashing or scoring the outer coat of the leaf transversely or crosswise preparatory for the scrapers.

My invention further consists in the combination of a revolving cutting-roller for gashing or scoring the coating of the leaves, an elastic bed-roller for supporting the leaves while undergoing the cleaning operation, and a revolving scraper-roller for removing the gashed sections from the leaves, as will be hereinafter more fully set forth.

Figure 1:
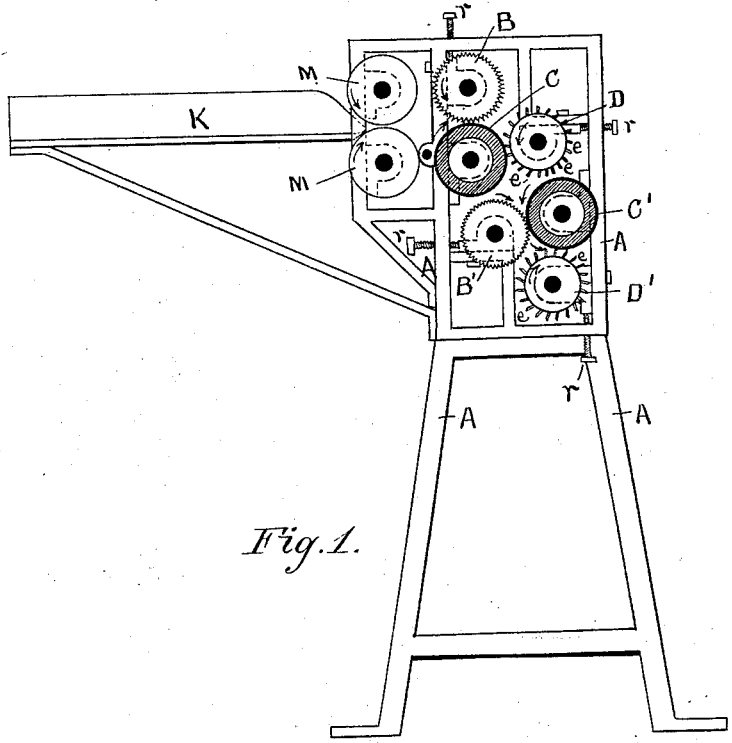
Figure 2:
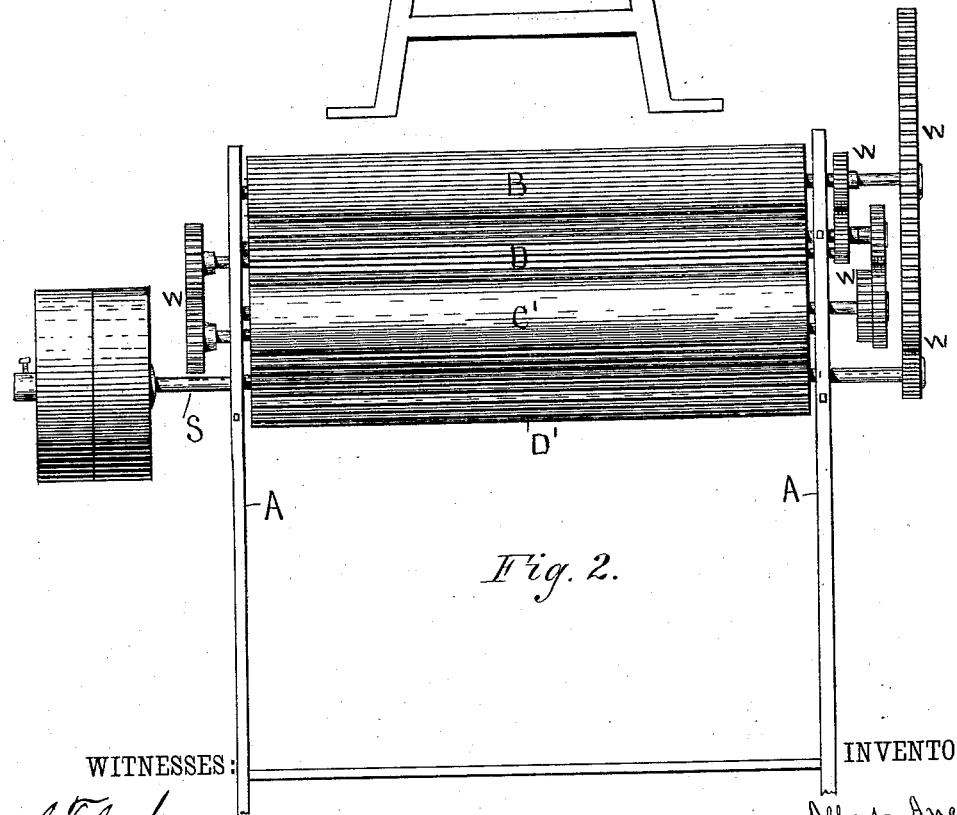

In the accompanying drawings, Figure 1 represents a vertical transverse central section of my improved machine, and Fig. 2 a front elevation of the same.

A is the frame of the machine.

B is a metallic roller, armed with a series of sharp-pointed teeth or acute sharp radial corrugations adapted to prick and pierce or cut transversely the hard outer coating of the *Bromelia sylvestris* and other similar fibrous plants or grasses; C, an elastic feed-roller, preferably made of rubber, and mounted to revolve in unison with the pricking-roller B in contact therewith, the two being geared together (see Fig. 2) to revolve toward each other, as indicated by the arrows in the drawings; D, a third metallic roller, mounted to revolve in front of the rubber roller C, and armed with a series of radial longitudinal blades or scrapers, $e$ $e$, projecting therefrom into close proximity to the face of the rubber roller. This scraping-roller D is geared to revolve at much greater speed than the rollers B C. (See Fig. 2.)

The set of feed and pricking rollers and scraping-rollers B C D is duplicated in a set mounted in the frame below the first, as shown at B', C', and D' in Fig. 1, the relative position of the pricking and feed rollers B' and C' being reversed, so that a leaf passing from the first set of rollers, B, C, and D, and pricked and scraped thereby upon one side shall be pricked and scraped upon the opposite side by the second set of rollers, B', C', and D'.

K is a suitable box or table, arranged to facilitate feeding the leaves to the machine.

M M are crushing-rollers mounted to revolve in front of the pricking-rollers B C, and geared to revolve toward each other, so as to flatten the thicker portion of the leaves and prepare them to pass readily between the rollers B C.

In operation the leaves placed upon the feed-table K are led between the crushing-rollers M M, which feed them forward and reduce them, if required, to a uniform flat condition. The leaves are then caught under the pricking-roller B, and its sharp teeth or cutting-edges pierce and cut the hard outer coating of the leaf upon one side, the opposed elastic roller serving as a cushion beneath the pricking-points or edges to prevent a mutilation of the inner fiber of the leaf as its outer shell is pierced and cut or broken by the pricking-roller. The leaf thus flattened, and having its hard outer coat cut and broken upon one side as it is fed slowly forward over the face of the rubber roller, is next subjected while still supported by the rubber roll to the action of the rapidly-revolving radial scraping-blades e e upon the roller D, which are so brought to bear upon the broken surface of the outer coating of the leaf as to tear and scrape it away from the inner fibrous portion. The leaves are then caught by the second pricking-roller, B', and led between it and the second rubber roller, C', and thence under the scraping-roller D', so that the opposite side of the leaf is broken and scraped in like manner as the first. Where the leaves are soft upon one side the second scraping-roller, B', is removed, and with thin flat leaves the first pair of crushing-rollers M M may be dispensed with. All the rollers are so mounted as to admit of ready adjustment to and from each other by means of set-screws r r r, or equivalent devices, and are driven from a main shaft, S, by a suitable train of gear-wheels, W W W.

What I claim as new, and desire to secure by Letters Patent, is—

1. The method of removing the outer hard coating of *Bromelia sylvestris* and kindred leaves which consists in forming a series of gashes or scores transversely across the leaf by cutters and then removing the gashed or scored coating sections by scrapers as said leaf is fed through a machine, substantially as described.

2. In a machine for dressing fibrous leaves, the combination of a roller formed or provided with cutting-blades for gashing the leaves transversely preparatory for scrapers and an elastic bed-roller adapted to rotate in unison with said cutting-roller in close proximity, substantially as described.

3. In a machine for dressing the leaves of *Bromelia sylvestris* and kindred plants, the combination, with each other and with an elastic supporting-roller, C, rotating in close proximity thereto, of a cutting-roller, B, rotating in unison with said roller C, and of a second scraping-roller, D, rotating at a greater speed, whereby the leaves fed between said rollers shall be supported upon the yielding surface of the elastic roller C while being first gashed upon one side by the roller B and then scraped on the same side by the more rapidly-rotating roller C, substantially in the manner and for the purpose herein set forth.

4. The combination, in a machine for dressing fibrous plants, with a set of rollers, B C D, adapted and operating, substantially as described, to cut and scrape the outer coat upon one side of a leaf or stalk fed thereto, of a second set of rollers, B', C', and D', adapted to receive from the first set the leaf or stalk dressed thereby on one side, and to cut and scrape in like manner the outer coat on its opposite side, substantially in the manner and for the purpose herein set forth.

In testimony whereof I have signed my name to this specification in the presence of two subscribing witnesses.

ALBERT ANGELL.

Witnesses:
J. F. ACKER, Jr.,
DAVID A. BURR.